(No Model.)
C. C. TYLER.
MACHINE FOR MAKING MILLING CUTTERS.
No. 435,573. Patented Sept. 2, 1890.
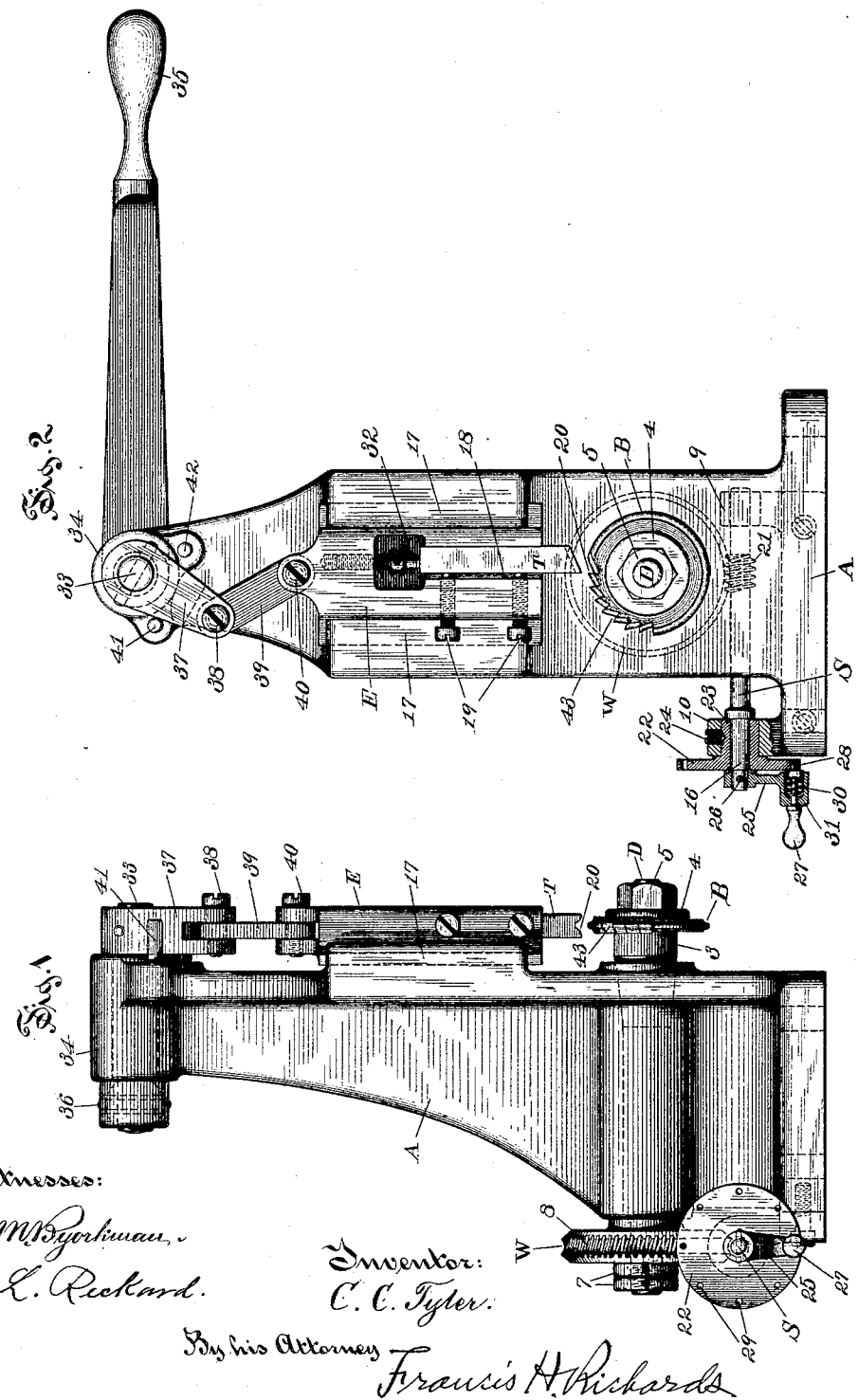
Witnesses:
W. M. Bjorkman
H. L. Reckard
Inventor:
C. C. Tyler.
By his Attorney
Francis H. Richards

UNITED STATES PATENT OFFICE.

CHARLES C. TYLER, OF CHESHIRE, CONNECTICUT.

MACHINE FOR MAKING MILLING-CUTTERS.

SPECIFICATION forming part of Letters Patent No. 435,573, dated September 2, 1890.

Application filed October 1, 1889. Serial No. 325,681. (No model.)

*To all whom it may concern:*

Be it known that I, CHARLES C. TYLER, a citizen of the United States, residing at Cheshire, in the county of New Haven and State of Connecticut, have invented certain new and useful Improvements in Machines for Making Milling-Cutters, of which the following is a specification.

This invention relates to machines for making milling-cutters by the method described and claimed in Letters Patent of the United States, No. 408,446, dated August 6, 1889.

In the drawings accompanying and forming a part of this specification, Figure 1 is a side elevation of a cutter-making machine embodying my invention. Fig. 2 is a front elevation in which some minor details are shown in section.

Similar characters designate like parts in both the figures.

For the manufacture of milling-cutters by means of my improved machine, I form the teeth by a compressing-tool T, after the method or process described and claimed in my said prior application, and ordinarily use an over-size blank B, only approximately shaped, and reduce the same to the required size simultaneously with and by the forming of the teeth on said blank. By this means, when making small cutters, (for which my said improvement is more particularly adapted,) the blanks may be first cut out, by means of cutting-dies, from sheet metal of suitable quality, and afterward cut or "toothed" without any other intermediate preparation than forming therein the usual central hole for the cutter-carrying arbor. Consequently by the said method and my improved machine I am able to produce the milling-cutters of a high quality and precision at a very low cost and of a very uniform size and shape.

The instrumentality by means of which I ordinarily practice my invention consists of a tooth-forming compressor-tool T, having on its working-face 20 a conformation coinciding with the form of tooth to be made, as illustrated in said prior application. This tool, when making circular cutters of a required size, is limited in its working-stroke to stop at a certain precise distance from the center of the said cutter, being for this purpose carried by some suitable guide or carrier—as, for instance, the slide herein shown and described. The tool T has its front face 40 substantially in the plane of its working-stroke, while its lower or working face 20 is crosswise to said front face, and has formed therein the tooth-shaping groove 45, which groove has a cross-sectional shape corresponding to that of the cutter-tooth which in any particular instance is to be made by the said tool. The working-face of the tool is also preferably made at an angle of less than ninety degrees from the said front face, so that the tool acts as a wedge to throw the metal under compression away from the cutting-face of the tooth-forming, the junction 50 of said working and front faces constituting a sharply-defined metal-dividing edge for dividing off that portion of the metal of the cutter-blank which is to be compressed by the said grooved working-face. This mode of operation may be readily understood from this description and drawings, taken in connection with my aforesaid Letters Patent.

The blank B is carried on an arbor D, which is carried in a closely-fitted bearing in the bed or frame A. Said blank is or may be affixed to its arbor by the tight and loose flanges 3 4, respectively, and the nut 5.

The arbor D is held in place longitudinally of its bearing by collars or otherwise, and is or may be revolved intermittingly by a suitable feed mechanism substantially as follows: A worm-wheel W is fixed on said arbor, by check-nut 7 or otherwise, and its teeth 8 mesh with the corresponding teeth on the worm 21, that is formed or fixed on the shaft S, which shaft is carried in bearings 9 and 10 on said frame. An index disk or plate 22 is carried by its hub 23 in said bearing 10, being held in place by a set-screw 24 or otherwise, and forming the immediate bearing for the outer end 16 of said shaft S. This shaft is turned by a crank-arm 25, fixed thereon by the pin 26, and having the handle 27, whose point 28 forms a stop-pin fitting the index-holes 29, that are formed in the said disk 22. A spring 30 contained within the hub 31 of the arm 25 serves to hold said index-pin in engagement with said index-holes. By making a suitable number of said index-holes equally spaced, and by turning said handle 27 through the required number of said spaces or divisions, any desired angular advance may be given to said cutter-arbor and the blank thereon.

The tooth-forming tool T is carried by a slide E, which moves in ways 17 on the forward side of the frame A. The tool is conveniently supported on said carrier by placing the same in a slot or channel 18, under the set-crews 19 and forward of the adjusting-screw 32, whereby said tool may be forced out toward the blank B to obtain the required adjustment thereof for properly forming cutting-teeth on said blank.

For actuating said carrier and tooth-forming tool I employ any well-known mechanical device adapted thereto. One of the most suitable of said devices is, in my opinion, the toggle-joint shown in the drawings. The shaft 33, carried in the bearing 34 on the frame A, is readily turned by means of the handle 35, which is fixed to one end thereof by the pin 36. At the forward end thereof said shaft carries thereon the arm or "link" 37, whose lower end is connected by pin 38 to the upper end of the lower link 39, that is connected by pin 40 to the said carrier-slide E. Stops 41 and 42 are provided to properly limit the movement of said links. In Fig. 1 the slide or carrier E is shown raised; but by raising the handle 35 the links 37 and 39 are brought into alignment, and the tool T forced down to form the tooth-space 43, immediately underneath the said tool, by a movement parallel to the face of the tooth-forming. The tool being now retracted by an opposite movement of the handle and links to the position shown in Fig. 1, the blank may be fed forward, as before described, and the tooth-forming operation repeated.

Having thus described my invention, I claim—

1. In a machine for making milling-cutters, the combination, with the blank-carrying arbor, of the reciprocating tooth-forming compressing-tool supported and operating, substantially as described, to have a movement toward the blank parallel to the vertical radius of the blank, all substantially as described.

2. In a machine for making milling-cutters, the combination, with the blank-carrying arbor, of the reciprocating tooth-forming compressing-tool T, having its movement in directions toward and from the blank on said arbor, the slide carrying said tool, and slide-actuating devices, substantially as described, for advancing said slide to a fixed point, and arbor-rotating devices, substantially as described, for advancing the arbor while the tool is retracted, all substantially as described.

CHARLES C. TYLER.

Witnesses:
H. J. STEWART,
W. A. RILEY.